United States Patent [19]

Gilgore et al.

[11] Patent Number: 4,793,473
[45] Date of Patent: Dec. 27, 1988

[54] CHAIN CONVEYOR ASSEMBLY

[75] Inventors: William H. Gilgore, York, Pa.; Gary A. Messerly, Richardson, Tex.

[73] Assignee: Teledynee, Inc., Los Angeles, Calif.

[21] Appl. No.: 96,490

[22] Filed: Sep. 15, 1987

[51] Int. Cl.$^4$ .............................................. B65G 39/20
[52] U.S. Cl. .................... 198/845; 198/838; 198/852; 99/479; 104/172.1; 104/243
[58] Field of Search ........................ 198/845, 850–853, 198/833, 834, 835, 836, 837, 838; 474/206, 209; 99/477, 478, 479; 104/172.1, 172.3, 172.5, 139, 140, 243, 245

[56] References Cited

U.S. PATENT DOCUMENTS

| | | |
|---|---|---|
| 993,313 | 5/1911 | Merz . |
| 2,526,563 | 10/1950 | Keen ................... 198/845 |
| 2,646,160 | 7/1953 | Michna . |
| 3,343,499 | 9/1967 | Burrows . |
| 3,496,784 | 2/1970 | Freeman . |
| 3,653,493 | 4/1972 | Kerr ................... 198/852 X |
| 3,774,545 | 11/1973 | Karlstrom ................ 104/172.5 |
| 3,880,276 | 4/1975 | Willett . |
| 3,934,708 | 1/1976 | Kambara ............... 198/838 X |
| 4,301,915 | 11/1981 | Michalik et al. .............. 198/851 |
| 4,422,544 | 12/1983 | Alldredge ................ 198/838 |
| 4,438,842 | 3/1984 | Alldredge ................ 198/845 X |
| 4,483,252 | 11/1984 | Pierson ................... 104/172.3 |
| 4,638,906 | 1/1987 | Winiasz .................. 198/845 X |
| 4,729,470 | 3/1988 | Bacigalupe et al. ............ 198/838 |

FOREIGN PATENT DOCUMENTS 2332498 1/1975 Fed. Rep. of Germany ...... 198/845

OTHER PUBLICATIONS

"Belts and Chains for Instrument Drives", Two-Dimensional Chain, date and source unknown.

Primary Examiner—Robert J. Spar
Assistant Examiner—Lyle Kimms
Attorney, Agent, or Firm—Sixbey, Friedman, Leedom & Ferguson

[57] ABSTRACT

A chain conveyor assembly wherein the conveyor chain is constructed to enable the chain to be flexed in two dimensions, e.g., about horizontal and vertical axes, and is designed to convey heavy loads in a stable manner despite the use of a simple and economical conveyor chain. In accordance with a preferred embodiment, the chain conveyor assembly is comprised of a conveyor chain that is formed of a series of wheel units, a guide track arrangement providing surfaces upon which wheels of the wheel units ride, a drive arrangement for driving the conveyor chain, and self-supporting trays for conveying of articles thereon. Each of the trays is coupled to a drive link arrangement that is used to interconnect successive wheel units together and by which the conveyor chain is driven by the drive arrangement. Each wheel unit is formed of a first and second single wheel, that is journalled to a first end of each link of a respective first and second pair of pivot links for rotation about a first axis extending normal to a direction of chain movement, and a third single wheel, which is journaled to a second end of each link of both pairs of pivot links for rotation about a second axis which extends normal to both the first axis and the direction of chain movement.

15 Claims, 5 Drawing Sheets

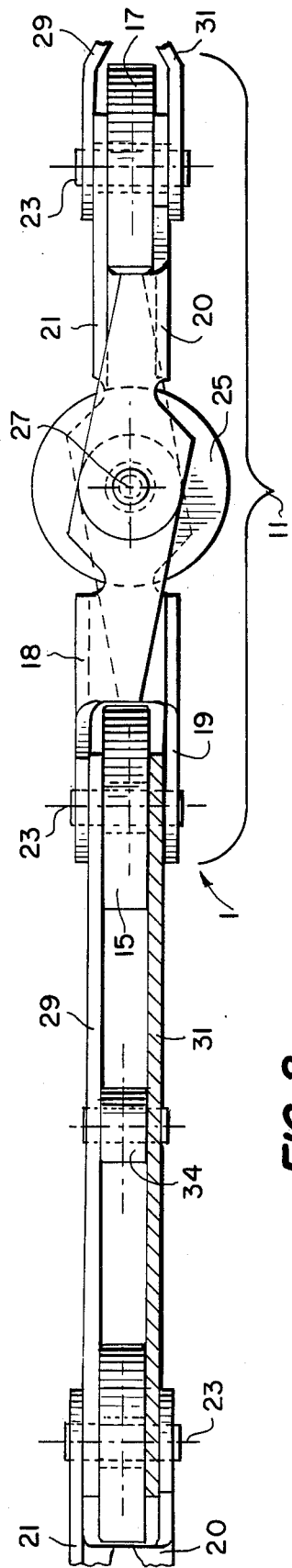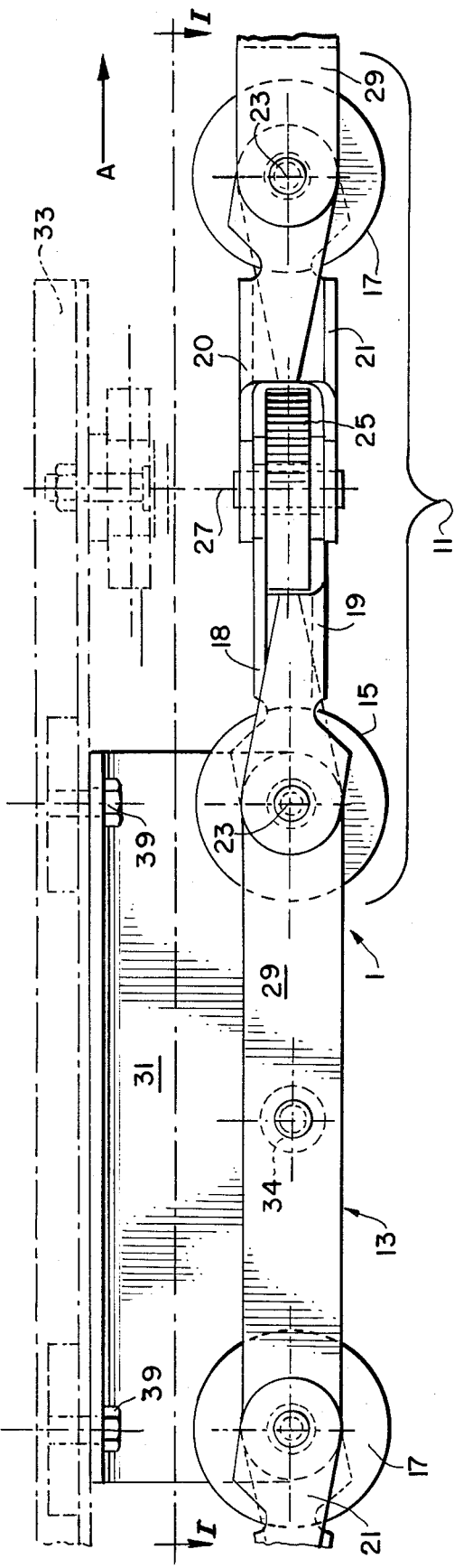

CHAIN CONVEYOR ASSEMBLY

BACKGROUND OF THE INVENTION

1. Field of the Invention

The present invention relates to chain conveyor assemblies of the type wherein a conveyor chain is driven so as to directly convey objects along a path determined by a supporting guide track for the conveyor chain. In particular, the present invention is directed to such chain conveyor assemblies wherein the conveyor chain is constructed to enable the chain to be flexed in two dimensions, e.g., about horizontal and vertical axes.

2. Description of Related Art

Chain conveyor assemblies of the aforementioned type have been in use for numerous purposes for a very long time and the construction of the conveyor chain of such assemblies is of key importance from several standpoints which involve competing factors. For example, as a major contributor to the cost of the chain conveyor assembly, the conveyor chain should be of as simple a construction as possible with a minimum number of wheels and pivot point connections. On the other hand, the great loads to which the chain will be subjected as the drive causes the chain to pull a load being transported by the chain conveyor assembly, as well as the need for stable guidance of the chain and load, has led to the development of conveyor chains and assemblies that are very costly to produce.

One simple chain design is disclosed in the chain carrier of Merz U.S. Pat. No. 993,313, wherein links consisting of an oval loop of rigid material is provided with an axle upon which is journaled a single bearing wheel. Alternate similar links are oriented at 90° with respect to each other so that the bearing wheels form an alternating series of vertical and horizontal axis wheels. The chain is driven directly by sprocket wheels and the articles to be transported are carried directly on the chain between standards rising at each side of each link. Another chain having an alternating series of horizontal and vertical axis bearing wheels, to which attachments such as rods, flights, and chains may be attached for conveying of products, is one produced by the Atlas Chain Company. The chain links of the Atlas chain are formed by pairs of identical link elements, each of which is provided with a right angle bend so as to enable each link element of a pair of link elements to support a respective end of a journal shaft of both a horizontal axis and a vertical axis bearing wheel. However, such constructions are suitable only for conveyance of light weight products as the designs are neither stable nor strong enough to withstand heavy loading conditions without breakage.

Typically, when an application requires a capacity to operate under heavy loading conditions, an approach has been taken to increase the strength of the link elements and to use pairs of wheels instead of a single bearing wheel. Examples of such conveyor chain arrangements can be found in Michna U.S. Pat. No. 2,646,160, Freeman U.S. Pat. No. 3,496,784, and Willett U.S. Pat. No. 3,880,276. However, assemblies using such conveyor chains are more expensive due to the increased cost associated with producing such conveyor chains, and assemblies utilizing such chains are normally used where the load is either supported, centered directly above or suspended, centered, directly below the conveyor chain due to the stresses which would be applied if the chain were to pull a load connected laterally of the chain's path of movement.

A conveyor system wherein a plurality of pallets, trays, or other load carriers are conveyed along a path by means of a single drive chain in an arrangement wherein the pallets, trays, or the like are supported at one side by a chain and at the other side on a fixed track or runway extending parallel to the chain is disclosed in Burrows U.S. Pat. No. 3,343,499. The conveyor chain of this conveyor system also uses pairs of rollers, a horizontal axis pair of rollers being arranged in a cruciform arrangement in relationship to a pair of vertical axis rollers, and each cruciform arrangement of rollers is interconnected by a pair of link elements to which a traction drive coupling, consisting of a bracket and a pair of small horizontal axis rollers, is mounted. However, the conveyor chain of this patent, like those of the Michna, Freeman and Willett patents imposes a signficantly increased cost factor with respect to production of the overall conveyor system. It is also noted that the conveyor system of the Burrows patent is designed to appropriately orient articles being conveyed by pivoting of the pallet and not by two dimensional flexing of the drive chain.

Accordingly, it can be seen that there is a need for a chain conveyor assembly which can be produced relatively inexpensively as well as provide stable guidance of heavy loads while being able to flex in two dimensions. In particular, it is desirable to be able to use a chain conveyor assembly which does not require the use of pairs of wheels instead of a single bearing wheel.

SUMMARY OF THE INVENTION

In accordance with the foregoing, it is a primary object of the present invention to provide a chain conveyor assembly that has a conveyor which can flex in two dimensions and is able to be stably guided without having to use bearing wheels in pairs, yet is capable of conveying heavy loads.

It is a further object of the present invention to provide a chain conveyor assembly having a conveyor chain of simple construction that can be produced economically.

Yet another object of the present invention is to provide a chain conveyor assembly wherein the tray means for supporting articles to be conveyed is self-supporting so as to reduce the stresses imposed upon the conveyor chain and so as to stabilize the chain against twisting.

These and other objects of the present invention are achieved in accordance with a preferred embodiment of chain conveyor assembly which utilizes a conveyor chain formed on a series of wheel units, each wheel unit of which has first and second single wheels journaled to a first end of each link of a respective first and second pair of pivot links for rotation about an axis extending normal to a direction of chain movement, and a third single wheel that is journaled to a second end of each link of both of the pairs of pivot links for rotation about a second axis which extends normal to both the first axes and the direction of chain movement. Each wheel unit of the series of wheel units forming the conveyor chain is linked in the direction of chain movement to a preceding and succeeding wheel unit by drive link means that include a rigid upper drive link and a rigid lower drive link, both of which are pivotally connected at opposite ends thereof at the axis of rotation of a respective first single wheel and second single wheel of the preceding and succeeding wheel units. Furthermore, the upper and lower drive links are rigidly interconnected to each other intermediate their opposite ends by a drive lug. A guide track means is provided with surfaces upon which the first, second, and third wheels ride as the conveyor chain is driven by a drive means that engages the drive lug. Tray means are provided for conveying of articles thereon, the tray means being self-supporting and being coupled to a drive link. Preferably, the drive link to which each tray means is coupled is in the form of a plate having an L-shaped cross section, a first leg of which extends transversely outwardly relative to the wheel units interconnected thereby and a second leg of which extends normal to the first leg and is secured to a frame member of the tray means. Advantageously, the frame member to which the drive link is connected is also provided with wheels that also ride on the guide track for the conveyor chain and enables the tray means to serve for stabilizing the conveyor chain.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a partial sectional view of a conveyor chain of a preferred embodiment chain conveyor assembly in accordance with the present invention taken along line I—I in FIG. 2;

FIG. 2 is a plan view of a portion of a conveyor chain of a chain conveyor assembly in accordance with the present invention, a portion of a tray means thereof being illustrated in phantom outline;

FIGS. 3 and 4 are, respectively, side and end elevational views of a drive link of the chain conveyor illustrated in FIGS. 1 and 2;

DETAILED DESCRIPTION OF THE PREFERRED EMBODIMENT

Figure 5:
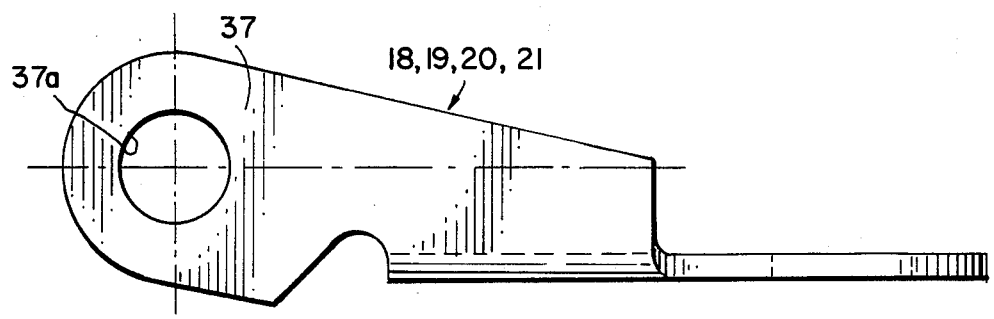
FIGS. 5 and 6, respectively, are a plan view and a side elevational view of a pivot link of the conveyor chain illustrated in FIGS. 1 and 2.

The chain conveyor assembly in accordance with the illustrated preferred embodiment of the present invention is comprised essentially of a conveyor chain 1 to which is attached a plurality of tray means 3, guide track means 5 which provide surfaces upon which the conveyor chain rides, drive means 7 for the conveyor chain 1, and a tray support rail 9 upon which the tray means 3 ride. A typical environment in which a chain conveyor assembly in accordance with the illustrated embodiment will find application is a baking oven or a dough proofing machine. In such an application, the chain must be able to sustain a 25,000 pound uniform tensile stress and 5,000 pound working load. The chain could be designed of a series of 36-inch long segment, corresponding to the tray pitch, which are repeated until there are enough trays to make up the total machine capacity, which may average, for a proofer, 3150 feet of chain or 1050 tray pitches, and in an oven matched in size to such a proofer, 375 feet of chain providing 125 tray pitches. The chain 1 is required to flex in two planes, e.g., horizontal and vertical planes, as the trays are conveyed about a circuit through the oven or proofer. However, since the chain conveyor assembly of the present invention consists of a repetition of identical segments, only a single segment thereof need be described in detail.

Each segment of the conveyor chain is formed of a wheel unit 11 and a drive link means 13 as illustrated in FIGS. 1 and 2. Each wheel unit 11 has a first single wheel 15 and a second single wheel 17, each of which is journaled to a first end of a respective first and second pair of pivot links 18, 19 and 20, 21 for rotation about a respective first axis 23, which extends normal to a direction of chain movement represented by the arrow A in FIG. 2. Additionally, a third single wheel 25 is journaled to a second end of each link of the pairs of pivot links 18, 19 and 20, 21 about a second axis of rotation 27, which extends normal to both the first axis 23 and the direction of chain movement A.

Each wheel unit 11 of the series of wheel units forming the conveyor chain 1 is linked, in the direction of chain movement A, to a preceding and a succeeding wheel unit by a respective drive link means 13. Each drive link means includes a rigid upper drive link 29 and a rigid lower drive link 31, both of which are pivotally connected at opposite ends thereof at a first axis of rotation 23 of a respective first single wheel 15 and second single wheel 17 of a preceding and succeeding wheel unit 11. Additionally, the upper and lower drive links 29, 31 are rigidly interconnected to each other intermediate opposite ends thereof by a drive lug 34.

Figure 6:
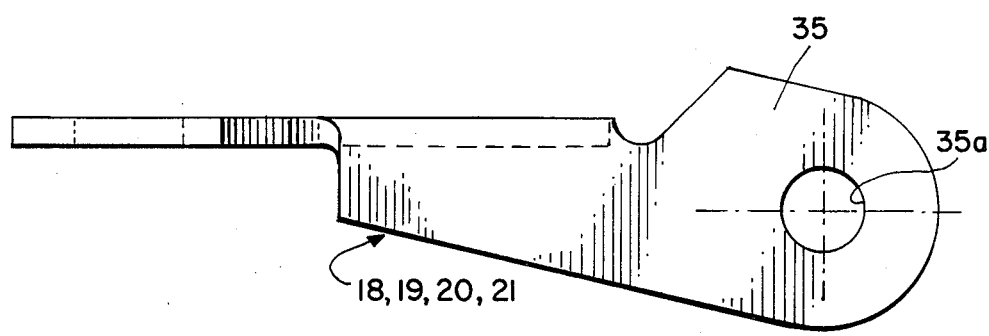

As can be seen from FIGS. 3 and 4, while the upper drive link 29 is merely bar-shaped, the lower drive link 31 is in the form of a plate having an L-shaped cross section. A first leg 31a of the L-shaped lower drive link 31, as can be seen from FIG. 2, extends transversely outwardly relative to the wheel units 11 interconnected thereby. A second leg 31b extends normal to the first leg 31a at an outer end thereof and is provided with holes 31c for use in securing the second leg 31b to a frame member 33 of the tray means 3. On the other hand, all of the pivot links 18, 19, 20, and 21 are identically constructed, in the manner illustrated in FIGS. 5 and 6, of an elongated link that has been bent in a manner causing a first half 35 to be disposed at right angles with respect to a second half 37. In each of the halves 35, 37, a hole 35a, 37a has been formed to receive an end of a journal bearing forming the pivot axes 27, 23, respectively. As can be appreciated, the conveyor chain 1 is able to flex in a first dimension by a pivoting of the drive link means 13 with respect to the wheel units 11 about the axis 23 and the conveyor chain is able to flex in a second dimension about the axes 27 interconnecting the pairs of pivot links 18, 19 with the pivot links 20, 21.

Figure 7:
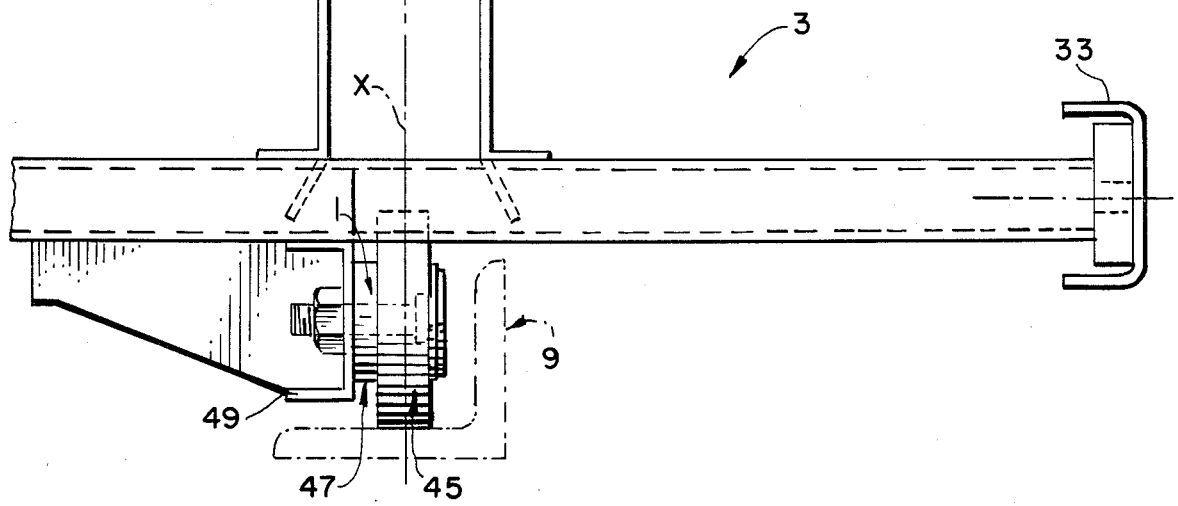
FIG. 7 is an end elevational view of just over a quarter section of a tray means of a chain conveyor assembly, but with the rear stabilizer wheel assembly removed.
Figure 8:
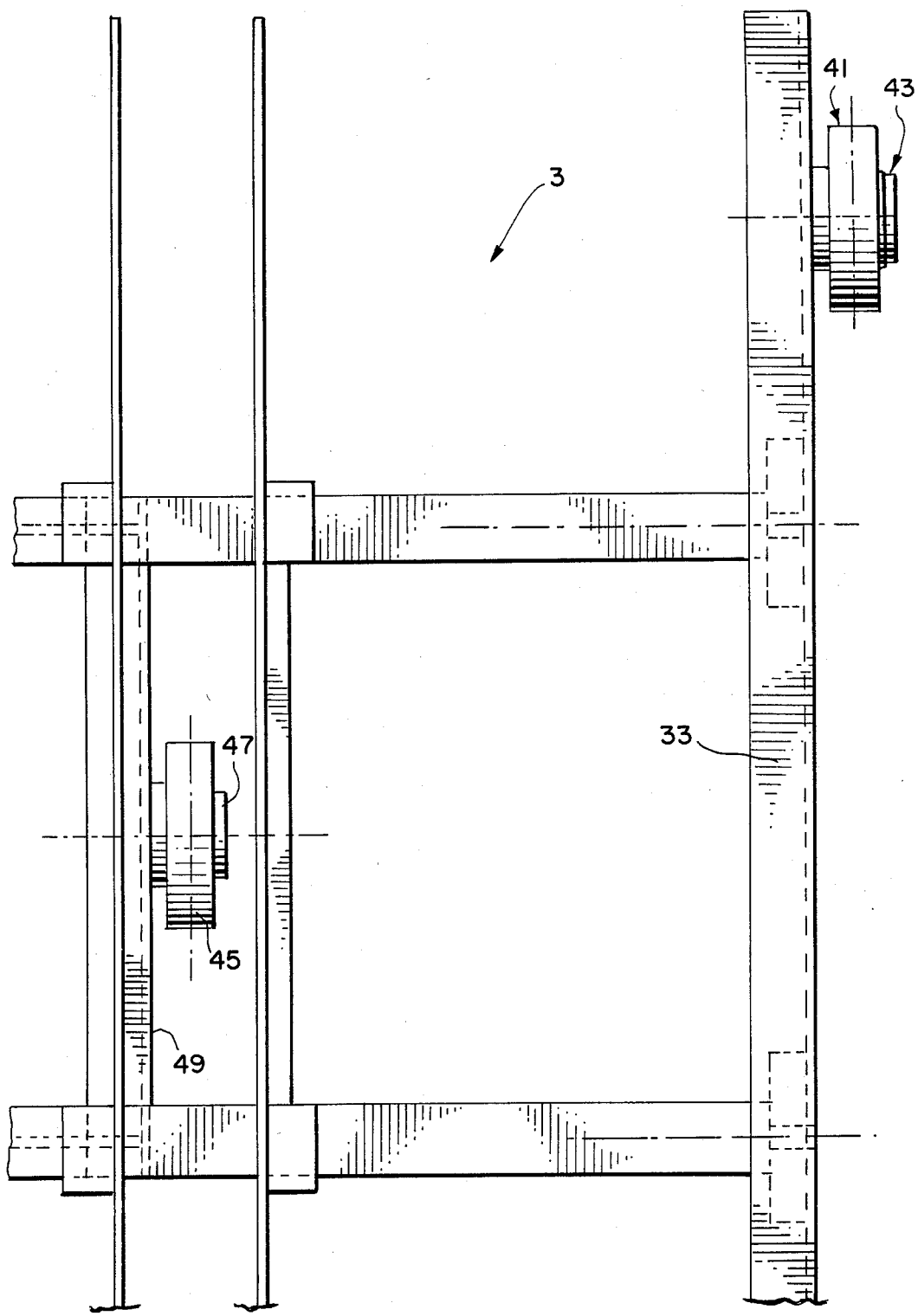
FIG. 8 is a top plan view of the rear quarter section of the tray means illustrated in FIG. 7, but including the rear stabilizer wheel assembly.

As a self-supporting tray means 3 for conveying of articles thereon, FIGS. 7 and 8, show a tray means as might be utilized in a dough proofer or baking oven for carrying, for example, a half-dozen pans. However, it should be appreciated that use of the term "tray means" is intended to encompass any conventional form of pallet, tray, or other load carrier so long as it is provided with characteristics equivalent to those described herein with respect to the tray means 3. In particular, at its side facing the conveyor chain 1, the tray means 3 is provided with the noted frame member 33 to which the drive link 31 may be attached, by a pair of bolts 39 (FIG. 2). Furthermore, at each end of the frame member 33, in front and behind drive link 31, a stabilizing wheel 41 is mounted to the frame 33 by a journal bearing arrangement 43. Similar to the mounting of stabilizer wheel 41 to frame 33 via journal bearing arrangement 43, a pair of support wheels 45 are attached via a journal bearing arrangement 47 to a channel-shaped frame member 49 so that the longitudinal center plane X (FIG. 7) of the tray means 3 passes centrally through the support wheels 45 (only the rear wheel of which is shown in FIG. 8). Both the stabilizing wheels 41 and the support wheels 45 are idler wheels which are freely rotatable. The support wheels 45 are supported on and ride along the guide rail 9 parallel to the guide track means 5 for the conveyor chain 1, and which guide track means 5 may also serve as a track surface for the stabilizer wheels 41.

Figure 9:
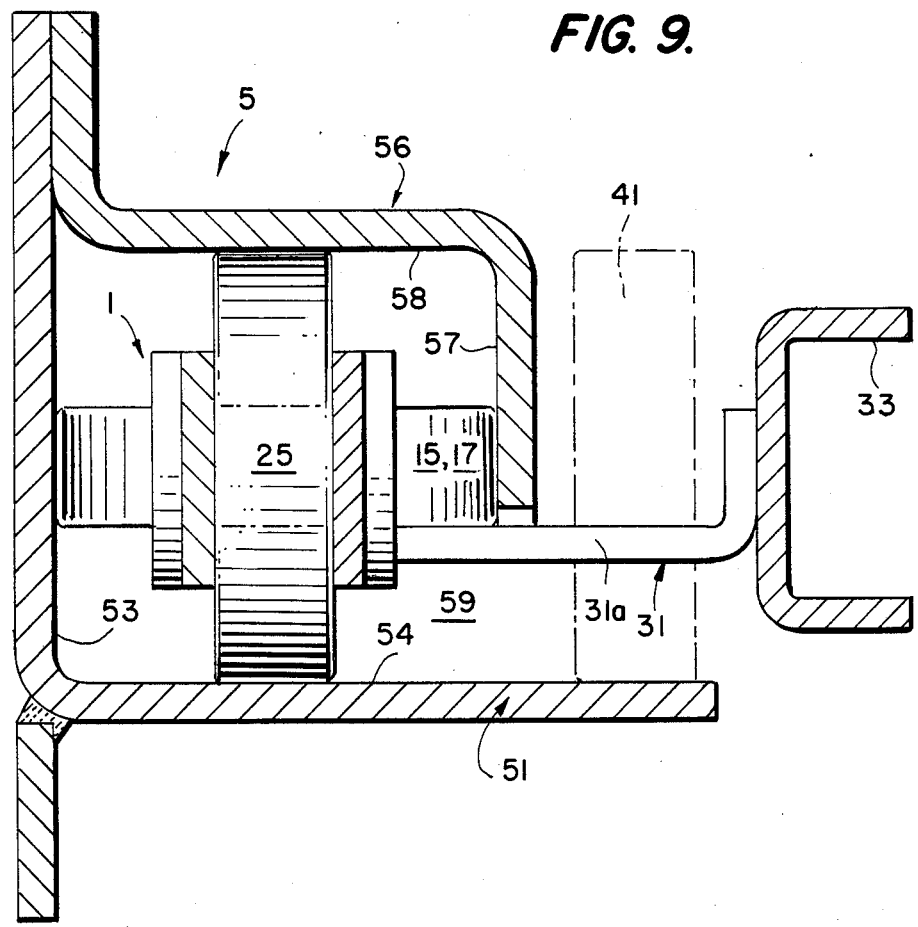
FIG. 9 is a partial cross-sectional view of a chain conveyor assembly of the present invention, taken through a guide track means for the conveyor chain.

Turning now to FIG. 9, the guide track means 5 of the chain conveyor assembly will be described. The guide track means 5 is comprised of a track rail portion 51 which has a first surface 53 upon which the first and second wheels 15, 17 ride, and a second surface 54 that is disposed normal to the first surface 53 and upon which the third wheel 25 of the wheel unit 11 rides. Guide track means 5 also includes a hold down guide portion 56 having third and fourth surfaces 57, 58 which are disposed parallel to the first and second surfaces 53, 54, respectively. The third surface serves for holding down and guiding the first and second wheels 15, 17 relative to the first surface 53, and the fourth surface 58 serves for holding down and guiding wheels 25 with respect to the second surface 54. Furthermore, in order to eliminate the need for a separate track for the stabilizing wheels 41, the track rail portion 51 of guide track means 5 extends transversely outwardly beyond the hold down guide portion 56 in order that its second surface 54 can also serve as a track surface for the stabilizing wheels 41 carried by the tray frame member 33 of the tray means 3. As can also be seen from FIG. 9, the fourth surface 57 is narrower than the second surface 53 in a manner creating a clearance gap 59 through which leg 31a of lower drive link 31 can extend outwardly from within the guide track means 5 to the frame member 33 of the tray means 3. It should be recognized that through this manner of construction, the stabilizer wheels 41, via the rigid interconnection of the drive link 31, serves as a means for preventing twisting of the conveyor chain 1 and tipping of the tray means 3.

Figure 10:
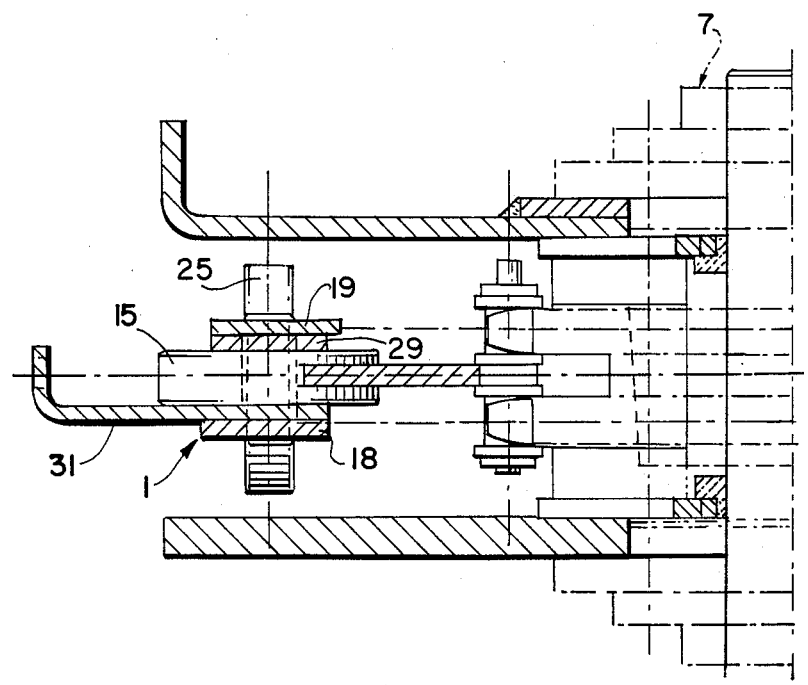
FIG. 10 is a partial sectional view of the chain conveyor assembly of the present invention taken in the vicinity of the caterpillar drive means for the conveyor chain.
Figure 11:
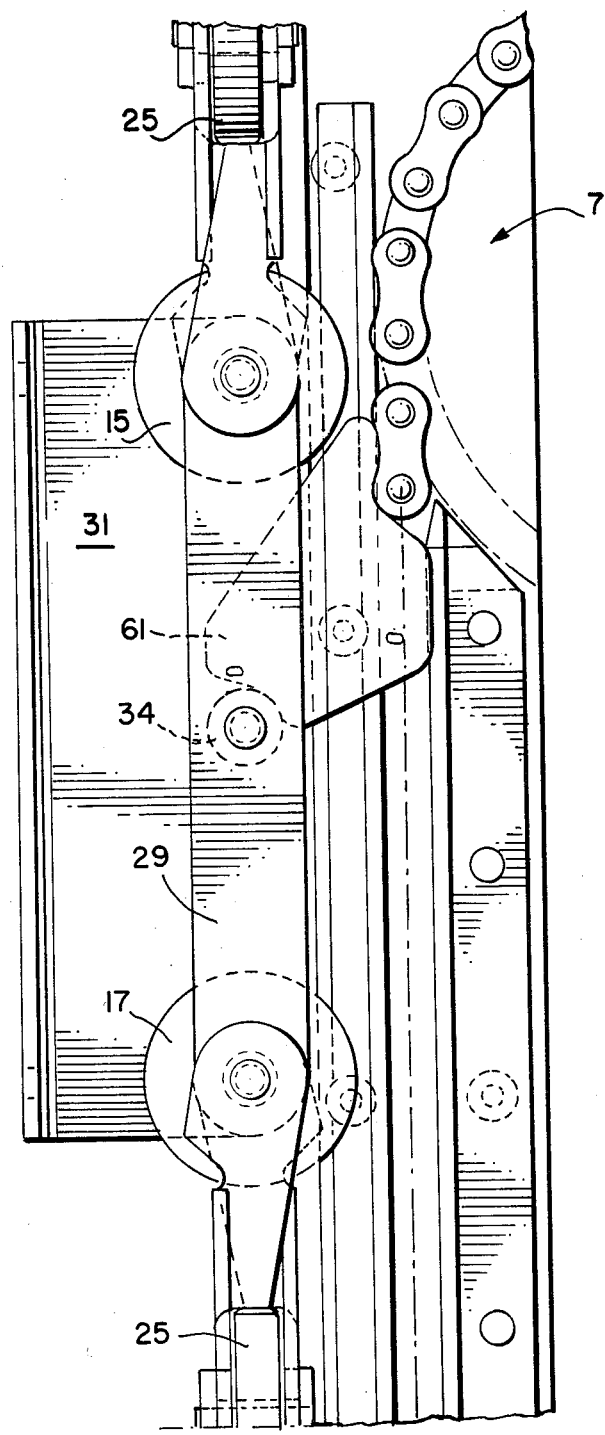
FIG. 11 is a plan view of a portion of the chain conveyor assembly in the vicinity of the caterpillar drive means for the conveyor chain.

FIGS. 10 and 11 show the manner in which a caterpillar drive may be used as the drive means 7 for the conveyor chain 1. Caterpillar drive arrangements are well known and thus the specifics thereof will not be described in detail. However, it is noted that by having the teeth 61 of the caterpillar drive engage the drive lugs 34, instead of any of the wheels of the conveyor chain, the drive load is taken by the lug 34 and not by any of the chain wheels, thereby avoiding overloading thereof. It is also contemplated that more than one tooth 61 of the caterpillar drive will be engaged with the conveyor chain 1 at any given point in time, and that more than a single drive station may be used.

As will be appreciated from the foregoing, the chain conveyor assembly in accordance with the present invention utilizes a conveyor chain of a very simple and economical to produce design, yet despite this fact, the overall assembly is able to convey heavy loads in two dimensions in a stable fashion whereby no undesirable torsion loads are imposed upon the conveyor chain due to the self-supporting nature of the tray means and its stabilizing interrelationship with respect to the conveyor chain.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A chain conveyor assembly comprising:
   A. A conveyor chain formed of a series of wheel units, each wheel unit having first and second single wheels journaled to a first end of each link of a respective first and second pair of pivot links for rotation about an axis extending normal to a direction of chain movement within a plane extending parallel to said direction of chain movement, and a third single wheel journaled to a second end of each link of both of said pairs of pivot links for rotation about an axis extending normal to both said plane and the direction of chain movement, each wheel unit of said series of wheel units being linked, in said direction of chain movement, to a preceding and a succeeding wheel unit by drive link means, said drive link means including a rigid upper drive link and a rigid lower drive link, both of which are pivotally connected at opposite ends thereof at the axis of rotation of a respective first single wheel and second single wheel of the preceding and succeeding wheel units, and said upper and lower drive links being rigidly interconnected to each other intermediate said opposite ends by a drive lug;
   B. guide track means for providing surfaces upon which said first, second and third wheels ride;
   C. drive means for driving said conveyor chain by engaging said drive lug; and
   D. self-supporting tray means for conveying of articles thereon, each said tray means being coupled to a said drive link means.

2. A chain conveyor assembly according to claim 1, wherein one of said lower and upper drive links of each drive link means is formed of a plate having an L-shaped cross section, a first leg of the L shape extending transversely outwardly relative to the wheel units interconnected thereby and a second leg of the L shape extending normal to said first leg at an outer end thereof, and wherein said second leg is secured to a frame member of said tray means.

3. A chain conveyor assembly according to claim 2, wherein said tray means is provided with wheels for supporting itself.

4. A chain conveyor assembly according to claim 1, wherein said tray means is provided with wheels for supporting itself.

5. A chain conveyor assembly according to claim 1, wherein said guide track means is comprised of a track rail portion, having a first surface upon which said first and second wheels ride and a second surface upon which said third wheel rides, said first and second surfaces being disposed normal to each other, and a hold down guide portion, having third and fourth surfaces which are disposed parallel to said first and second surfaces, respectively, said third surface serving for holding down and guiding said first and second wheels, and said fourth surface serving for holding down and guiding said third wheels.

6. A chain conveyor assembly according to claim 5, wherein said tray means is provided with wheels for supporting itself, said wheel including wheels carried by a frame member of said tray means to which said drive link means is connected, and wherein said second surface extends transversely outwardly beyond said hold down guide portion to a position for serving as a track surface for the wheels carried by said tray frame member.

7. A chain conveyor assembly according to claim 6, wherein one of said lower and upper drive links of each drive link means is formed of a plate having an L-shaped cross section, a first leg of the L shape extending transversely outwardly relative to the wheel units interconnected thereby and a second leg of the L shape extending normal to said first leg at an outer end thereof, and wherein said second leg is secured to said frame member of said tray means, and wherein said fourth surface is narrower than said second surface in a manner creating a clearance gap through which said plate can extend outwardly from within the guide track means to said frame member of the tray means.

8. A chain conveyor assembly according to claim 5, wherein one of said lower and upper drive links of each drive link means is formed of a plate having an L-shaped cross section, a first leg of the L shape extending transversely outwardly relative to the wheel units interconnected thereby and a second leg of the L shape extending normal to said first leg at an outer end thereof, and wherein said second leg is secured to said frame member of said tray means, and wherein said fourth surface is narrower than said second surface in a manner creating a clearance gap through which said plate can extend outwardly from within the guide track means to said frame member of the tray means.

9. A chain conveyor assembly according to claim 1, wherein the coupling of the drive link means to the tray means comprises a rigid interconnection of a drive link to a side frame member of the tray means, and wherein said side frame member carries stabilizer wheel means for preventing twisting of the conveyor chain and tipping of said tray means.

10. A chain conveyor assembly according to claim 9, wherein said tray is provided with support wheel means for carrying said tray means, said support wheel means being mounted beneath a central portion of the tray means and rides upon a tray supporting track.

11. A chain conveyor assembly according to claim 10, wherein one of said lower and upper drive links of each drive link means is formed of a plate having an L-shaped cross section, a first leg of the L shape extending transversely outwardly relative to the wheel units interconnected thereby and a second leg of the L shape extending normal to said first leg at an outer end thereof, and wherein said second leg is secured to a frame member of said tray means.

12. A chain conveyor assembly according to claim 11, wherein said stabilizer wheel means comprise a wheel mounted on said frame member in front of and behind the second leg of the L-shaped plate of the drive link means.

13. A chain conveyor assembly according to claim 9, wherein one of said lower and upper drive links of each drive link means is formed of a plate having an L-shaped cross section, a first leg of the L shape extending transversely outwardly relative to the wheel units interconnected thereby and a second leg of the L shape extending normal to said first leg at an outer end thereof, and wherein said second leg is secured to a frame member of said tray means.

14. A chain conveyor assembly according to claim 13, wherein said stabilizer wheel means comprise a wheel mounted on said frame member in front of and behind the second leg of the L-shaped plate of the drive link means.

15. A chain conveyor assembly according to claim 1, wherein said drive means is a caterpillar drive means.

* * * * *